March 7, 1967 C. J. SHOAF 3,307,966
SHAPED STRUCTURES TREATED WITH POLYEPOXIDE AND POLYISOCYANATE
FOR IMPROVING ADHERENCE TO RUBBERS
Filed Oct. 29, 1963 2 Sheets-Sheet 1
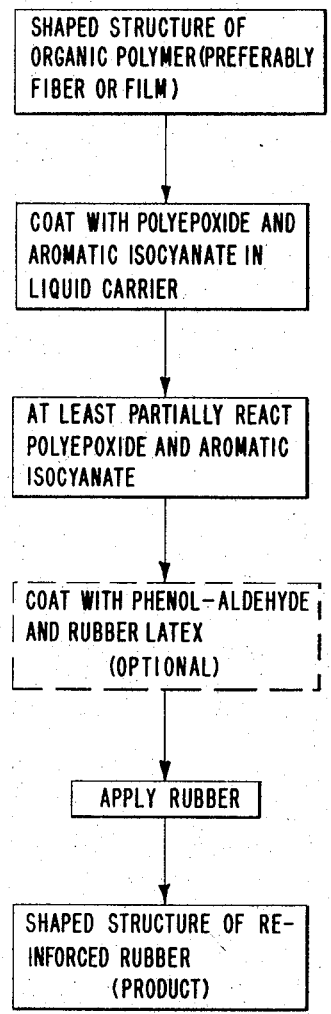
*INVENTOR*
CHARLES JEFFERSON SHOAF
BY
*ATTORNEY*

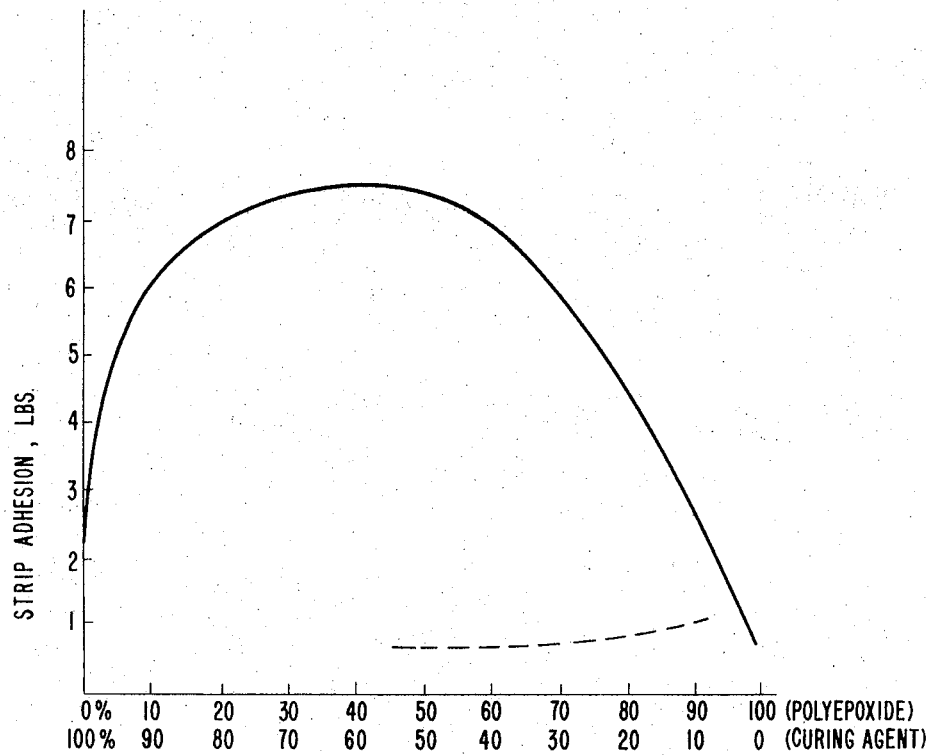
FIG. II

United States Patent Office 3,307,966
Patented Mar. 7, 1967

3,307,966
SHAPED STRUCTURES TREATED WITH POLY-EPOXIDE AND POLYISOCYANATE FOR IMPROVING ADHERENCE TO RUBBERS
Charles Jefferson Shoaf, Wilmington, Del., assignor to E. I. du Pont de Nemours and Company, Wilmington, Del., a corporation of Delaware
Filed Oct. 29, 1963, Ser. No. 320,605
10 Claims. (Cl. 117—76)

This application is a continuation-in-part of my application Serial No. 211,952 filed July 18, 1962 as a continuation-in-part of my application Serial No. 139,907 filed September 22, 1961, and application Serial No. 182,502 filed March 26, 1962. These three prior applications are now abandoned.

This invention relates to the treatment of shaped structures and more particularly to a method for treating shaped structures such as films and fibrous textile materials to improve their adhesion to rubber. Specifically, the invention provides a new and useful composition of matter for treating shaped structures of organic polymers to improve their ability to adhere to rubber under severe flexing conditions.

It is an object of this invention to provide an adhesive system which gives a superior adhesive bond between elastomer compositions and organic polymeric shaped structures. A further objective is to provide an adhesive system providing superior adhesion between elastomer compositions and synthetic linear condensation polyester fibers. A further objective is to provide such a system which is applicable with a variety of fibers and elastomer compositions. A still further objective is to provide such a system in which the components are stable both before and after application to the fibrous material, which does not require the use of inflammable solvents, and which can be applied with generally available equipment. Other objectives will appear hereinafter.

STATEMENT OF INVENTION

In accordance with the present invention, a novel composition of matter, useful as a precoating for improving adherence between rubbers and shaped structures of organic polymers, is provided comprising a liquid carrier containing from about 0.05% by weight to about 10.0% by weight of solids of (A) a polyepoxide having an average of at least two epoxy groups in each molecule, a melting point below about 150° C., an average molecular weight below about 3000 and an epoxide equivalent below about 2500 and (B) an aromatic polyisocyanate from the class consisting of $Ar(NCO)_n$, $[Ar(NCO)_n]_m$, and $Ar(NHCOX)_n$, wherein Ar is an organic residue containing at least one aromatic nucleus, X represents an aryloxy, arylthio, iminoxy or lactam-N-yl radical, and m and n are whole numbers of at least 2; the weight ratio of (A)/(B) being within the range of from about 0.01 to about 5.0, the said liquid carrier being chemically inert to each of (A) and (B). The liquid carrier may be a solvent for one or both of components (A) and (B) or either or both of (A) or (B) may be suspended in the carrier as a dispersed or emulsified phase. This composition, when applied and processed as described below provides a final shaped structure bearing a coating of the reaction product of (A) with (B) constituting from about 0.2 to about 5% by weight of the coated structure. The composition of the present invention is applied to the polymeric shaped structure by any conventional means such as dipping, spraying, brushing, padding or the like with the structure relaxed or under tension. Reaction of (A) with (B) occurs upon drying when (B) is an isocyanate per se. When (B) is the dimer or the adduct of the isocyanate the wetted shaped structure is heated at a temperature of from about 150° C. to about 235° C. for a period of from 0.5 to about 15 minutes to remove the liquid carrier and to cure the coating. Particularly where the shaped structure is fibrous in nature, it is preferred that the structure be subjected to at least sufficient tension to prevent shrinkage during the wetting and subsequent curing operations. Alternatively the reactants (A) and (B) can be applied separately in either order from the same or different liquid carriers to the shaped structure instead of applying them simultaneously from the same carrier as described above.

Following formation of the polyepoxide-polyisocyanate reaction product on the shaped structure, rubber coatings may thereafter be applied by conventional techniques, preferably, but not necessarily, first coating with a phenol-formaldehyde rubber latex, preferably an aqueous resorcinol-formaldehyde solution and butadiene-vinyl pyridine latex as taught in U.S. Patent No. 2,990,313 to Knowles et al. (referred to hereinafter as an RFL coating).

DRAWINGS

The invention will be more readily understood by reference to the drawings. FIGURE I is a flow sheet outlining the steps for preparing the shaped structure of reinforced rubber using an organic polymeric shaped structure as the reinforcing material. As will be seen by following the various steps outlined, the organic polymeric shaped structure (preferably a fiber or film) is coated with a composition of the present invention, i.e., a polyepoxide and aromatic polyisocyanate in a liquid carrier, which coating is thereafter at least partially cured by reaction between the polyepoxide and aromatic polyisocyanate. Thereafter the rubber is applied. Optionally, after at least partial curing of the polyepoxide and aromatic polyisocyanate and prior to application of rubber, the organic polymeric structure is given a second coating with a phenol-aldehyde rubber latex. The product is reinforced rubber shaped structure.

FIGURE II is a graph wherein strip adhesion in pounds resulting from a single end strip adhesion test is plotted as ordinate versus an abscissa of varying curing agent-polyepoxide compositions, the left-hand side of the curve representing a condition of 0% polyepoxide and 100% curing agent, whereas the right-hand side of the curve represents 100% polyepoxide and 0% curing agent. The unbroken curve represents the results obtained using the polyepoxide-isocyanate composition of the present invention whereas the dashed curve represents the polyepoxide-amine composition of the prior art. These curves are discussed in greater detail in Example 1.

The following examples are cited to illustrate the invention. They are not intended to limit it in any manner In the examples illustrating the manner in which the invention may be carried out and the advantages obtained three methods of determining the strength of the adhesive bond are used:

(1) The single end strip adhesion test.
(2) The "H-pull" test.
(3) The two-ply strip adhesion test.

In preparing samples for the single end strip adhesion test (SESA), lengths of treated cord are placed in the bottom of a steel mold, the cords being parallel with a spacing of 1 inch between cords. The cords are placed under dead weight tension to maintain their position. A sheet of unvulcanized compounded elastomer stock 125 mils in thickness is placed over the cords, covered with a cotton duck reinforcing backing, and the top plate of the mold placed over the backing. The mold is put into a platen press. A pressure of approximately 150 p.s.i. is applied and the mold is usually heated to about 145° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly embedded in the cured elastomer stock, but are visible on the surface. This sheet is cut into 1-inch wide strips, each having a cord in the center of its width. The cord end is separated from one end of the strip; the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord.

The "H-pull" test is the well-known test described, for example, in India Rubber World, 114, 213–219 (May 1946), "Study of the 'H' Test for Evaluating the Adhesive Properties of Tire Cord in Natural and GR–S Rubber." Briefly, a dipped cord is cured across the center of two small rectangles of rubber with a short length of the cord exposed between the rubber pieces forming the cross-bar of the H. The pieces of rubber are gripped in an Instron Tensile Testing machine and stress is applied so that the cord is pulled out from one of the pieces of rubber. The load required is regarded as a measure of the adhesion. In the examples of the present specification, the width of the rubber pieces are reduced to ¼ inch since greater width samples resulted in cord breaks rather than adhesive failure due to the high level of adhesion experienced with this new adhesive system.

The two-ply strip adhesion test is carried out on a laminated structure containing two plies of parallel dipped tire cords (29 ends per inch) separated by a thin layer of rubber. The laminar structure is built up in successive layers consisting of a cotton duck reinforcing backing, a 25 mil sheet of unvulcanized rubber, a layer of parallel cords, two layers of 25 mil rubber, another layer of parallel cords, a 25 mil layer of rubber and a final cotton duck backing. A small strip of Holland cloth or other suitable material is inserted between the center two layers of rubber at one end of the structure to prevent bonding and allow a portion of each ply to remain free for clamping when testing. The laminate is then molded, vulcanized under pressure, and cut into 1-inch wide strips. The force required to separate the two fabric plies of a 1-inch wide strip is taken as a measure of the adhesion. If desired, a woven fabric, such as used for conveyor belt reinforcement, may be substituted for the parallel cords when adhesion of fabric to rubber is being tested.

The RFL coating of the examples is prepared by mixing 73.7 grams of resorcinol, 40.0 grams 37% formaldehyde, 148 ml. of water, and 480 ml. of a 41% solids butadiene/styrene/vinylpyridine (70/15/15) copolymer latex, and allowing the mixture to age at room temperature for 5 days. After applying it to the shaped structure the adhesive mixture is cured at 218° C. for 45 seconds with an applied stretch of 2%. Usually the dry solids pickup in this step in tire cord treatment is approximately 6% by weight based upon the weight of the original cord.

The rubber stock A referred to in the examples is a blended nature rubber/styrene-butadiene rubber/reclaimed rubber tire skim stock of approximately 60/20/20 composition by weight.

Rubber stock B has the following composition:

| | Parts by wt. |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

Unless otherwise indicated in the examples, all adhesion tests are by the SESA technique described above, upon a sample coated with rubber stock A, the test having been made at 25° C.

*Example 1*

A glycidyl polyether of glycerol and epichlorohydrin is prepared as taught in U.S. Patent No. 2,902,398 at col. 4, lines 1–24 ("Polyether A"). This polyepoxide is a pale yellow viscous liquid with an epoxide equivalent of about 150 and with a molecular weight of about 320 as measured in dioxane solution by the boiling-point-rise method.

To 400 ml. of water are added 0.4 ml. (0.09%) of an alkyl aryl polyether alcohol nonionic dispersing agent ("Triton X–100" available from Rohm and Haas Co., Philadelphia, Pa.) and 16.0 grams (3.6%) of phenol-blocked methylene-bis-(4-phenylisocyanate). The mixture is milled to a fine dispersion. To the mixture is added 25.0 ml. of a 0.5% solids solution (0.028%) of a high molecular weight diethylaminoethyl methacrylate polymer as the acetate salt as a thickener (Brookfield viscosity 780 cps.). Then 4.8 ml. of the polyepoxide (1.04%) described above is added with stirring. A polyethylene terephthalate tire cord having an 1100 denier/2 ply (120 tex./2 ply) construction with 12.5 turns per inch Z twist in the singles and 12.5 turns per inch S twist in the ply is dipped in the aqueous mixture prepared above and heated in an oven for 45 seconds at 218° C. under an applied stretch of 5% to give a precoated cord having a dried coating pickup of about 1.5% by weight.

The RFL coating is then applied as previously described followed by application of rubber stock by conventional techniques. Results of the various tests upon sample structures are reported in Table I below.

TABLE I

| Test Procedure | A[1] | | B[1] | |
|---|---|---|---|---|
| | 25° C. | 140° C. | 25° C. | 140° C. |
| SESA, lbs./end | 7.4 | 2.5 | 7.9 | 6.8 |
| H-pull (¼" x ¼") | 20.4 | 9.7 | (²) | 19.5 |
| 2-ply strip, lbs./in | 68 | 39 | | |

[1] Rubber identity. Results show strip adhesion in pounds of tension.
² Cord breaks.

A series of tests is conducted upon test strips prepared following the above procedure except that the proportion of the polyepoxide and the isocyanate curing agent is varied from 0:100 to 100:0. The results obtained are graphically illustrated by the unbroken curve of FIGURE II. For comparison purposes ethylene diamine is used as a curing agent in place of the isocyanate in a series of experiments, the results being graphically illustrated by the dashed curve of the same figure.

Example 2

(a) The aqueous polyepoxide-isocyanate bath of Example 1 is modified to the following concentrations:

|  | Percent |
|---|---|
| Isocyanate | 3.8 |
| Dispersing agent | 0.05 |
| Thickening agent | 0.06 |
| Polyepoxide | 1.3 |

The composition is applied to the tire cord of Example 1, following the technique of that example except that a 2% stretch is applied to the yarn during application of the aqueous polyepoxide-isocyanate. An SESA test using A rubber stock gives a value of 7.5 lbs. at 25° C.

(b) When the procedure is repeated except that the aqueous polyepoxide-isocyanate is applied at half strength, a value of 6.5 lbs. is obtained.

Examples 3 to 15 inclusive are modifications of Example 2(a) above. The modifications and results of SESA tests using A rubber stock at 25° C. are noted in Table II.

TABLE II

| Example | Modification | Adhesion |
|---|---|---|
| 3 | No isocyanate employed | 0.7 |
| 4 | No polyepoxide employed | 2.8 |
| 5 | Glycerine (1.6%) used instead of polyepoxide | 2.3 |
| 6 | Diethylene glycol (1.8%) used instead of polyepoxide. | 1.9 |
| 7 | No thickener employed | 5.8 |
| 8 | Gum tragacanth used as thickener instead of DAMA[1] of Example 1. | 6.8 |
| 9 | A 1:1 copolymer of DAMA acetate and acrylic acid (0.16%) used as thickener in place of DAMA[1] of Example 1. | 6.9 |
| 10 | "Kopoxite 159" (resorcinol, diglycidyl ether, Koppers Co., Pittsburgh, Pa.) used instead of polyepoxide of Ex. 2. | 6.4 |
| 11 | "Gen-Epoxy 175" (diphenololpropane diglycidyl ether, General Mills, Minneapolis, Minn.) used instead of polyepoxide of Ex. 2. | 4.0 |
| 12 | Toluene diisocyanate phenol adduct (5%) used instead of isocyanate of Ex. 2. | 5.8 |
| 13 | Acetone oxime adduct (4%) of isocyanate used instead of phenol adduct of Ex. 2. | 3.1 |
| 14 | Nylon tire cord used instead of poly-(ethylene terephthalate). | 5.8 |
| 15 | Rayon tire cord used instead of poly-(ethylene terephthalate). | 6.1 |

[1] Diethylaminoethyl methacrylate polymer.

Example 16

(a) A plain weave conveyor belt fabric made up from a polyethylene terephthalate warp and 66 nylon filling is dipped in the precoating composition of Example 2 and squeezed lightly in a hand wringer to remove excess liquid. The fabric is then heat set on a tenter frame for 3 minutes at 150° C. The dried fabric is then dipped in a resorcinol-formaldehyde-latex adhesive composition described in Example 1, and allowed to air dry. In two-ply strip adhesion tests using a GRS rubber, as well as a natural rubber stock, values greater than 90 pounds per inch are obtained.

(b) The procedure is repeated with the exception that the precoating composition is dried for 3 minutes at 176° C. In a two-ply strip adhesion test using a neoprene rubber stock, a value of 95 pounds per inch is obtained.

(c) A sample of the conveyor belt fabric bearing the cured precoating composition only, i.e., with no resorcinol-formaldehyde-latex mixture applied as a top coat, is tested for adhesion to neoprene rubber in the two-ply strip adhesion test. An adhesion value of 65 pounds per inch is obtained.

(d) When procedure (c) is repeated using a precoating composition having twice the solids concentration as above, and with the precoating cured in two steps consisting of 3 minutes at 150° C. followed by 1 minute at 175° C., an adhesion value of 90 pounds per inch is obtained.

Example 17

An 1100 denier (120 tex.) polyethylene terephthalate yarn is dipped in the precoating composition of Example 2 and dried at 125° F. for 3 minutes under a slight tension. The coated yarn is then plied and twisted into a standard tire cord construction having a total denier of 2200 (240 tex.) and hot-stretched at 218° C. with an exposure time of 45 seconds and an applied stretch of 2%. The cord is then dipped in the resorcinol-formaldehyde-latex adhesive composition of Example 1 and again hot-stretched as above. The cord exhibits a single end strip adhesion value of 7.2 pounds in A rubber.

Example 18

A sample of 7.5 mil polyethylene terephthalate film is coated with an aqueous mixture containing 2% of the phenol adduct of diphenylmethane-4,4'-diisocyanate, 0.4% of the polyepoxide of Example 1 and 0.5% diethylaminoethyl methacrylate gel polymer. The coated film is cured 1 minute at 210° C., overcoated with a resorcinol-formaldehyde-latex composition, dried, and again cured for 1 minute at 210° C. The adhesive coated film is pressed against "A" rubber and cured for 45 minutes at 140° C. In a peel test in which an attempt is made to peel the film from the rubber, failure occurs only within the rubber. The film-rubber interface remains firmly bonded.

Example 19

A polyethylene terephthalate tire cord of 1100/2 construction is coated with an adhesive according to the procedure of Example 2, with the exception that the hot-stretching conditions after precoating utilize a temperature of 230° C. for 1.3 minutes with an applied stretch of 1.5%, and the hot-stretching conditions following the resorcinol-formaldehyde-latex dip utilize a temperature of 210° C. for 1.3 minutes with an applied stretch of −0.5%. Dry solids pickup amount to 1.3% by weight for the precoat and 7.8% by weight for the fully processed double-coated cord.

A single end strip adhesion test in "B" rubber at 140° C. gives a value of 6.8 pounds.

The adhesive-coated cord prepared above is used to build a four-ply 8.50 x 14 automobile tire by standard methods known to the art. The skim stock used is a mixture of natural and butadiene/styrene rubber, and the tread stock is all butadiene/styrene rubber. The tire is then subjected to a high speed endurance test in which the tire is run against a steel wheel, 4 feet in diameter, at 75 m.p.h. under conditions of standard inflation pressure, and 10% overload, with an ambient temperature of 100° F.

Three tires tested according to the above procedure are found to run an average of 2850 miles before tread separation is observed. One of the tires runs over 5000 miles before tread separation occurs. This is in contrast to the average tread separation mileage of about 600 observed for tires constructed of polyethylene terephthalate cords dipped with the resorconol-formaldehyde-latex formula only.

Example 20

A polyethylene terephthalate V-belt cord of 1100/2/5 construction is dipped in the precoating composition of Example 2 and hot stretched at a temperature of 230° C. with an exposure time of 1 minute and an applied stretch of 3%. The dried cord is then coated with a solvent solution of neoprene rubber, air dried, and embedded in a typical neoprene V-belt stock for a single end strip adhesion test. Test values greater than 12 pounds are obtained with failure occurring solely in the rubber stock. The fiber-rubber interface remains intact.

Example 21

(a) A polyethylene terephthalate tire cord of 1100/5 construction is dipped in a precoating solution containing 82 parts by volume benzene, 10 parts 3-pentanone, 8 part of a 50% solution of methylene-bis(4-phenyl isocyanate) in monochlorobenzene, and 0.4 part of the polyepoxide described in Example 1. The dipped cord is then immediately cured for 45 seconds at 220° C. while applying 2% stretch. The precoated cord is then given a second adhesive layer consisting of a resorcinol-formaldehyde-latex composition as described in Example 1, using the same curing conditions. When tested for adhesion using rubber stock A, the adhesive-treated cord is found to give a single end strip adhesion value of 7.4 pounds at 25° C.

(b) Procedure (a) is repeated with the quantity of polyepoxide in the precoating adhesive composition increased to 1.5 parts. The adhesive-treated cord gives a strip adhesion value of 8.3 pounds.

(c) Procedure (a) is repeated using 4.0 parts of the polyepoxide in the precoating composition, but with no isocyanate compound present. The treated cord gives a strip adhesion value of 1.1 pounds.

(d) Procedure (a) is repeated maintaining a 2:1 ratio by volume of the 50% solution of methylene-bis(4-phenyl isocyanate) in the monochlorobenzene to the polyepoxide in the precoating adhesive mixture (a 1:1 ratio by weight of reactants). By appropriate dilution, the solids concentration in the polyepoxide-isocyanate composition is adjusted to various levels, applied to polyethylene terephthalate tire cord. The adhesion values obtained in the single end strip adhesion test and in the "H-pull" test are presented in Table III.

TABLE III

| Dip Concentration, Percent Solids | Strip Adhesion, Pounds | H-Pull, Pounds |
|---|---|---|
| 5.0 | 7.4 | 20.2 |
| 2.5 | 7.3 | 20.9 |
| 1.7 | 7.6 | 19.5 |
| 1.3 | 6.8 | 20.2 |
| 0.8 | 7.0 | 15.0 |
| 0.5 | 6.2 | 18.0 |
| 0.25 | 3.8 | ------ |
| 0.12 | 2.0 | 14.2 |

(e) Procedure (a) is modified using 100 parts of benzene and 8 parts of the phenol adduct of toluene diisocyanate. The cord produced gives a single end strip adhesion test value of 7.8 pounds.

(f) Experiment (e) is repeated with 2 parts polyepoxide in the precoating solution. The cord produced gives a strip adhesion test value of 8.0 pounds.

(g) Experiment (e) is repeated in all details with the exception that no polyepoxide is included in the precoating solution. The cord produced gives a strip adhesion test value of only 1.8 pounds.

*Example 22*

(a) A polyethylene terephthalate tire cord of 1100/2 construction is dipped in a precoating adhesive composition consisting of 50 parts acetone, 50 parts 3-pentanone, 6 parts methylene-bis(4-phenyl isocyanate) phenol adduct, and 0.4 part of the polyepoxide of Example 1. The dipped cord is cured for 45 seconds at 218° C. under 2% applied stretch and overcoated with a resorcinol-formaldehyde-latex coating as described in Example 1. The treated cord is found to give a single end strip adhesion test result of 6.0 pounds.

(b) Procedure (a) is repeated using 0.8 part of the polyepoxide in the precoating composition. The cord gives a strip adhesion test result of 7.5 pounds.

(c) Procedure (a) is repeated with the exception that no polyepoxide is included in the precoating composition. The cord produced gives a strip adhesion test value of only 2.7 pounds.

*Example 23*

(a) A polyethylene terephthalate tire cord of 1100/2 construction is dipped under low tension in a precoating adhesive composition consisting of 90 parts benzene, 10 parts 3-pentanone, 2.8 parts of a 50% solution of methylene-bis(4-phenyl isocyanate) in monochlorobenzene, and 0.6 part of the polyepoxide of Example 1. The dipped cord is allowed to air dry at room temperature. The precoated cord is then dipped in the resorcinol-formaldehyde-latex composition described in Example 1 and cured for 90 seconds at 218° C. under 3% applied stretch. In the single end strip adhesion test using rubber stock A, the cord gives a value of 7.0 pounds.

(b) For comparison, the general procedure of Example XV of Schroeder, U.S. 2,902,398, is repeated as follows: 10 ml. (100 parts) of the polyepoxide of Example 1 is mixed with 10 ml. (100 parts) of a 10% aqueous solution of a hydrolyzed polyvinyl acetate (Elvanol[1] 50–42), and 47 grams of water added to bring the solution to a 15% polyepoxide solution. 2.5 ml. (25 parts) of ethylene diamine are added as curing agent.

The 1100/2 polyethylene terephthalate tire cord is then treated with the above mixture, stretched, and dried at 145° C. for 5 minutes.

The treated cord is then padded with an aqueous medium containing 20% by weight of a mixture of melamine-formaldehyde resin and a vinylpyridine-butadiene polymer. This mixture was prepared by adding 24.5 ml. (245 parts) of 41% vinyl-pyridine-styrene-butadiene copolymer latex (General Tire and Rubber Company's "Gen-Tac") to 26 ml. (260 parts) of a 10% melamine-formaldehyde resin solution, and 6 ml. (60 parts) additional water added to make up to 22% solution. After padding, the cord is dried at 90° C.

The polyethylene terephthalate cord treated by the above two-step process is then tested for adhesion in the previously described single-end strip adhesion test using rubber stock A and a molding time of 60 minutes at 145° C. A test value of 0.4 pound is obtained.

*Example 24*

(a) A zero twist polyethylene terephthalate yarn composed of 250 filaments having a total denier of 1100 (120 tex.) is dipped in a precoating solution composed of 160 parts benzene, 20 parts 3-pentanone, 4 parts of a 50% solution of methylene-bis(4-phenyl isocyanate) in monochlorobenzene, and 2 parts of the polyepoxide described in Example 1. The dipped yarn is heated to a temperature of 218° C. for 45 seconds, during which time it is stretched approximately 2%. The treated yarn is then twisted and plied to give a tire cord of 1100/2 construction with 12.5 turns per inch Z twist in the singles and 12.5 turns per inch S twist in the ply. The cord is then given a top coat of a resorcinol-formaldehyde-latex adhesive composition as in Example 1 and cured for 45 seconds at 218° C. under 2% applied stretch. In the single end strip adhesion test using rubber stock A, the cord gives a value of 5.1 pounds.

(b) Procedure (a) is repeated without the precoating composition being applied to the yarn, i.e., only the resorcinol-formaldehyde-latex adhesive is applied. A strip adhesion value of only 0.6 pound is obtained.

*Example 25*

A polyethylene terephthalte tire cord having an 1100 denier/2 ply construction with 12.5 turns per inch Z twist in the single and 12.5 turns per inch S twist in the ply is dipped in an aqueous dispersion containing 3.5% by weight of phenol-blocked meta-phenylene diisocyanate (MPDI), 0.25% of dioctyl sodium sulfosuccinate wetting agent, 0.04% gum tragacanth and 0, 1.3, 1.8 or 2.2% of the polyepoxide of Example 1. This subcoat is cured 30 seconds at 425° F. with 2% applied stretch. The treated cord is then overlayed with an RFL coating as in Example 1 and cured 45 seconds at 425° F. with 2% applied stretch. The results of SESA strip adhesion tests are shown in Table IV.

---
[1] Du Pont trademark.

TABLE IV

| Subcoat Dip Composition | | SESA, lbs. | | |
|---|---|---|---|---|
| Percent Blocked MPDI | Percent Polyepoxide | Rubber "A" | | Rubber "B" |
| | | 25° C. | 140° C. | 25° C. |
| 3.5 | 0 | 1.9 | 0.3 | -------- |
| 3.5 | 1.3 | 5.8 | 1 | 8.0 |
| 3.5 | 1.8 | 8.0 | 2.2 | 8.5 |
| 3.5 | 2.2 | 8.5 | 2.0 | 7.8 |

*Example 26*

Example 25 is repeated except for the use of 5% instead of 3.5% of the phenol-blocked meta-phenylene diisocyanate in the subcoat. Two experiments are made in which the subcoat is cured for 60 seconds at 210° C. and the RFL overlay is also cured for 60 seconds at 210° C., but with the amount of stretch applied to the cord during curing varied as indicated in Table V. The adhesion results are shown in the table.

TABLE V

| Subcoat, Percent Stretch | Overlay, Percent Stretch | SESA, lbs. (25° C.) | |
|---|---|---|---|
| | | Rubber "A" | Rubber "B" |
| 5 | 0 | 6.0 | 8.2 |
| 0 | 5 | 6.0 | 8.5 |

*Example 27*

Example 25 is repeated except that the subcoat dispersion contains 5.0% of the blocked meta-phenylene diisocyanate, 0.12% of the wetting agent, 0.04% gum tragacanth and 2.0% of the polyepoxide, and is cured for various times and temperatures. The results are shown in Table VI.

TABLE VI

| Sec. | ° F. | SESA, lbs. (25° C., Rubber "A") |
|---|---|---|
| 60 | 380 | 6.1 |
| 60 | 410 | 6.9 |
| 20 | 425 | 5.7 |
| 30 | 425 | 6.0 |
| 40 | 425 | 6.6 |

*Example 28*

(a) A polyethylene terephthalate tire cord of 1100/2-ply construction is dipped in a precoating solution containing 30 parts by weight of the bis-ε-caprolactam adduct of 4,4'-diphenylmethane diisocyanate (C–MDI), 15 parts of the polyepoxide of Example 1, 1.5 parts dioctyl sodium sulfosuccinate, 0.25 part gum tragacanth, and 540 parts of water. The dipped cord is heated for one minute under 1% applied stretch at the temperature indicated in Table VII and then overcoated with the RFL adhesive mixture described below, following which the cord is again heated for one minute under 1% applied stretch at 210° C. Strip adhesion values obtained for this cord in rubber stock A and B are shown in Table VII.

The RFL coating used above is prepared by mixing 1.38 parts of resorcinol, 2.02 parts of 37% formaldehyde, 2.39 parts of 8.5% aqueous sodium hydroxide, and 27.8 parts of water. This mixture is aged for six hours at 75°–78° F. and then added to a mixture of 30.5 parts of 41% solids butadiene/styrene/vinylpyridine (70/15/15) copolymer latex diluted with 7.64 parts water. The final mixture is allowed to age for 12 hours before using.

(b) Procedure (a) is repeated using the bis-ε-caprolactam adduct of meta-phenylene diisocyanate (C–MPDI) instead of C–MDI. The strip adhesion values obtained with this adhesive-coated cord are also shown in Table VII.

TABLE VII

| Isocyanate Compound | Subcoat Curing Temp., ° C. | SESA, lbs. | | |
|---|---|---|---|---|
| | | Rubber "A" | Rubber "B" | |
| | | 24° C. | 24° C. | 140° C. |
| C-MDI | 210 | 6.9 | 8.5 | 5.6 |
| C-MDI | 221 | 5.1 | 6.7 | 6.0 |
| C-MPDI | 210 | 5.8 | 5.9 | 4.9 |
| C-MPDI | 221 | 5.1 | 6.2 | 5.7 |

*Example 29*

The bis-ε-caprolactam adduct of 2,4-toluene-diisocyanate (C–TDI) is used, with the polyepoxide of Example 1, to prepare a series of aqueous precoating compositions in which the total solids content is maintained at approximately 6%. The mixtures contain about 0.25% by weight dioctyl sodium sulfosuccinate as a dispersing agent. These precoating compositions are applied to a polyethylene terephthalate cord of 1100/2 construction following the general procedure of Example 28 with the exception that a curing temperature of 218° C. is used. The precoated cords are overcoated with the RFL mixture of Example 28, using a curing temperature of 204° C. Strip adhesion values are determined for each cord in rubber stock B with the results shown in Table VIII.

TABLE VIII

| Subcoat Dip Composition | | SESA, lbs. (Rubber B) | |
|---|---|---|---|
| Percent C-TDI | Percent Polyepoxide | 24° C. | 140° C. |
| 6.0 | 0 | 1.3 | 0.23 |
| 5.0 | 1.0 | 4.2 | 2.8 |
| 4.5 | 1.5 | 5.1 | 3.6 |
| 3.0 | 3.0 | 6.3 | 3.8 |

*Example 30*

The general procedure of Example 1 is repeated with the exception that the dimer of 2,4-tolylene diisocyanate is used instead of phenol-blocked methylene-bis-(4-phenylisocyanate) in preparing the precoating adhesive mixture. After the RFL coating is applied, adhesion tests are carried out using rubber stock B, with the results shown in the following table.

TABLE IX

| Test Procedure | Test Temperature | |
|---|---|---|
| | 25° C. | 140° C. |
| SESA, lbs./end | 4.2 | 2.5 |
| H-pull (¼" x ¼") | 17.0 | 8.2 |

The term "polyepoxide" is used to describe uncured chemical compounds having an average of at least two epoxy groups, i.e., at least two

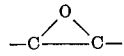

in each molecule, a melting point below 150° C., an average molecular weight below 3,000, and an epoxide equivalent below 2,500. The preferred epoxy compounds are those having a melting point below 100° C., an average molecular weight below 1,500, and an epoxide equivalent below 850. They may be saturated or unsaturated, aliphatic, cycloaliphatic, aromatic or heterocyclic and may contain substituents for hydrogen such as alkyl, halogen, hydroxyl and alkoxy. Such compounds are commonly prepared by the reaction of halohydrins with polyhydric alcohols or with polyhydric phenols; as for example, the reaction of epichlorohydrin with glycerol or with bis-phenol. Such compounds are described in "Epoxy Resins" by Lee and Neville, McGraw-Hill Book Company Inc., New York, 1957, pages 1–21. The term "epoxide equivalent" is the weight of resin in grams which contain 1 gram chemical equivalent of epoxy groups. The value is determined by the method described in Lee and Neville, page 21. Many suitable specific polyepoxides, all of which are suitable in the present invention are listed in U.S. Patent No. 2,902,398 to Schroeder, dated September 1, 1959.

The second essential component of the precoating composition of the present adhesive system is an aromatic polyisocyanate having the formula $Ar(NCO)_n$, i.e., the polyisocyanate per se, or a dimerized isocyanate

or an adduct of an aromatic polyisocyanate,

By a compound having the formula $[Ar(NCO)_n]_m$ is meant a "dimer" or "polydimer" formed by self-condensation of two or more polyisocyanate molecules. Such dimers consist of aryl groups connected by the uretidinedione structure

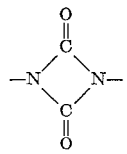

Dimers are relatively inert, being stable in the presence of water at room temperature, but dissociate upon heating to give the free isocyanate.

By a compound having the formula $Ar(NHCOX)_n$, is meant an adduct of an aromatic polyisocyanate and an active hydrogen compound exemplified by phenols, thiophenols, oximes and lactams. Compounds of this type are relatively inert, being stable in the presence of water at room temperature. However, when heated to temperatures above about 100° C., these compounds dissociate, yielding free isocyanate compounds capable of undergoing all the reactions characteristic of polyisocyanate compounds.

The radical Ar, of the formula $Ar(NHCOX)_n$, may be any organic residue containing at least one aromatic nucleus. Specific examples of suitable polyisocyanate adducts are illustrated in United States Patent 2,994,671 to Thompson dated August 1, 1961. In a preferred embodiment of the present invention the diisocyanate has at least two of the (NHCOX) groups attached to aromatic carbon atoms in such positions that the aromatic nucleus has no substituents ortho to these two (NHCOX) groups. Among these may be specifically mentioned diphenylmethane-4,4'-diisocyanate, toluene-2,4-diisocyanate, metaphenylene-diisocyanate (diphenyl ether) - 2,4,4'-triisocyanate and their various adducts as related above.

The polyepoxide-polyisocyanate reactants are applied in a liquid carrier to the shaped structure. The nature of the carrier is not critical. Where the polyisocyanate adduct or dimer is employed, water is generally the most convenient carrier. However, it will be apparent to those skilled in the art that since the isocyanate per se reacts with water, non-aqueous systems must be used when this embodiment is applied. Since the carrier acts solely as a vehicle for the reactants, the reactants need not be in solution in the carrier but may be dispersed or emulsified in it. The concentration of reactants in the carrier may vary widely but generally the use of compositions containing from about 0.05% to about 10% by weight of reactants wherein the ratio of polyepoxide to polyisocyanate is between about 0.01 to about 5.0 is satisfactory. Preferably the ratio of reactants is between about 0.05 and about 2.3.

In addition to the polyepoxide and the polyisocyanate adduct, the preferred aqueous precoating composition of this invention may also contain, if desired, optional materials such as wetting agents, dispersing agents, viscosity builders, and epoxide curing agents and promoters such as a tertiary amine. For example, a non-ionic dispersing agent, such as an alkyl aryl polyether alcohol, may be used to disperse a finely-divided solid isocyanate adduct in water for the preparation of the precoating composition. The viscosity of the coating composition may be adjusted by the addition of well-known thickening agents such as gum tragacanth, or by a compound such as the acetate salt of polydiethylaminoethylmethacrylate which serves both as a viscosity builder and as an amine catalyst non-reactive to epoxides at room temperature but reactive at elevated temperatures.

As pointed out previously, after applying the liquid carrier containing the polyepoxide-polyisocyanate reactants to the shaped structure it is necessary that reaction be made to occur between the reactants. Generally it is convenient to accomplish this during the drying operation when using the polyisocyanate per se. Reaction between the reactants occurs upon drying at room temperature. On the other hand, when the dimer or the adduct of the polyisocyanate is employed, a higher temperature, e.g., at least about 135° C. and preferably at least about 150° C. is required to promote reaction. Higher temperatures may be employed to hasten the reaction but usually a temperature within the range of from about 150° C. to about 235° C. is preferred in the treatment of fibrous structures. The period necessary for the drying operation will vary widely depending upon factors such as the nature of the carrier and the temperature employed. The shorter periods are favored by higher temperatures and more volatile solvents. When treating fibrous structures it is generally preferable to perform this "curing" operation with the structure under at least sufficient tension to prevent shrinkage. At times it is advantageous to apply sufficient tension to stretch the structure during this operation. When the composition is applied as taught herein the shaped structure will pick up a coating of reactants constituting from about 0.2 to about 5% by weight of the coated structure. Generally it is preferred to adjust concentrations and conditions of application to provide a coated structure containing reactants constituting about 0.5 to about 2.5% by weight of the coated structure.

The polymeric structures bearing the cured polyepoxide-polyisocyanate coating may be bonded to rubber in the customary manner by use of heat and pressure to form reinforced articles in which both the dry and wet adhesion of the synthetic polymer to rubber is outstanding, and in which both cold and hot adhesion is superior to that hitherto known. The adhesion afforded by the composition of this invention is superior on polyester structures over a broader range of application and testing conditions and in a wider variety of rubber stocks, to that obtained with any other adhesive system known. While the composition is particularly valuable for polyester structures, it is to be understood that it is also suitable for other polymeric structures, such as polyamide fibers, as well as cellulosic structures and the natural fibers.

As has been demonstrated in the examples, prior to applying the rubber coating, it is preferred (but not essential) to overlay the cured polyepoxide-polyisocyanate coating with at least about 0.5% by weight (and preferably from about 2 to about 25% by weight) of adhesive coating of a phenol aldehyde condensate (for example as taught in United States Patent 2,330,217 to Hunn dated September 28, 1943) and a butadiene vinyl pyridine latex. Such compositions and their methods of application are well known in the art and taught in detail in United States Patent 2,990,313 to Knowles et al. dated June 27, 1961.

The nature of the "rubber" in the final shaped structure is not critical and may be either a natural or a synthetic rubber. Furthermore, the technique of applying the rubber to the reinforcing structure prepared in accordance with the present invention (e.g. film, fiber or the like) is accomplished by conventional and well known techniques. It will be apparent to those skilled in the art that the rubber stock applied may contain additives such as vulcanizers, fillers, pigments, antioxidants and the like.

Compositions produced according to the present invention may be utilized for a wide variety of important industrial applications. They may be used, for example, in the preparation of pneumatic tires for automobiles, buses, tractors and aircraft, in transmission belts, conveyor belts, floor tiles, hoses, raincoats, luggage, and the like.

The process of the invention may be applied to the treatment of any fibrous material useful in the reinforcing of rubber products, such as cotton, rayon, nylon, and the like. However, especially valuable results are obtained when the invention is applied to polyester fibers and other shaped structures such as those prepared from polyethylene terephthalate, because of the inadequacy of previously known adhesive systems. Illustrative of the polyesters useful in preparing shaped structures which may be bonded to rubber by the process of this invention are those disclosed in United States Patents 2,465,319, 2,965,613 and 2,901,466.

Many obvious modifications of the above invention will be apparent to those skilled in the art without a departure from the inventive concept.

I claim:
1. A shaped structure of an organic polymer bearing from about 0.2 to about 5% by weight of a coating consisting essentially of the reaction product of (A) a polyepoxide having an average of at least two epoxy groups in each molecule, a melting point below about 150° C., an average molecular weight below about 3000 and an epoxide equivalent below about 2500 and (B) an aromatic polyisocyanate from the class consisting of $Ar(NCO)_n$, $[Ar(NCO)_n]_m$, and $Ar(NHCOX)_n$ wherein Ar is an organic residue containing at least one aromatic nucleus, X is a radical selected from the group consisting of aryloxy, arylthio, iminoxy and lactam-N-yl, and $m$ and $n$ are whole numbers of at least 2, the weight ratio of (A)/(B) being within the range of from about 0.01 to about 5.0.

2. The shaped structure of claim 1 wherein the said structure is in the shape of a film.

3. The structure of claim 1 wherein (B) is phenol-blocked meta-phenylene diisocyanate.

4. A rubber reinforced structure wherein the reinforcing element is the structure of claim 3.

5. The shaped structure of claim 1 wherein the said structure is in the shape of a fiber.

6. The structure of claim 5 bearing an adhesive coating of a latex and a phenol-aldehyde condensate.

7. A rubber reinforced structure wherein the reinforcing element is the structure of claim 5.

8. The shaped structure of claim 5 wherein the said fiber is a polyester.

9. The structure of claim 8 bearing an adhesive coating of a latex and a phenol-aldehyde condensate.

10. A rubber reinforced structure wherein the reinforcing element is the structure of claim 8.

References Cited by the Examiner

UNITED STATES PATENTS

| | | | |
|---|---|---|---|
| 2,594,979 | 4/1952 | Nelson | 260—17.2 |
| 2,993,825 | 7/1961 | Gage | 117—145 X |
| 3,196,035 | 7/1965 | Yanagihara et al. | 117—47 |
| 3,234,067 | 2/1966 | Krysiak | 117—76 X |

WILLIAM D. MARTIN, *Primary Examiner.*

R. HUSACK, *Assistant Examiner.*